US012039521B1

(12) United States Patent
Swiderski et al.

(10) Patent No.: US 12,039,521 B1
(45) Date of Patent: Jul. 16, 2024

(54) CONTACTLESS USER IDENTIFICATION BY DIGITAL WALLET TO RETAILER POINT OF SALE

(71) Applicant: WALGREEN CO., Deerfield, IL (US)

(72) Inventors: Christopher John Swiderski, Prairie View, IL (US); Sergio Garcia, Chicago, IL (US); Shalini Kondreddy, Vernon Hills, IL (US); Gregory John Damler, Crystal Lake, IL (US); Satya Chandra Mouli Kota, Prospect Heights, IL (US); Marcus Osacky, Glenview, IL (US); George Findling, Buffalo Grove, IL (US)

(73) Assignee: WALGREEN CO., Deerfield, IL (US)

( * ) Notice: Subject to any disclaimer, the term of this patent is extended or adjusted under 35 U.S.C. 154(b) by 0 days.

(21) Appl. No.: 18/134,289

(22) Filed: Apr. 13, 2023

Related U.S. Application Data

(63) Continuation of application No. 17/317,467, filed on May 11, 2021, now Pat. No. 11,663,586.

(51) Int. Cl.
*G06Q 20/36* (2012.01)
*G06Q 20/20* (2012.01)
*G06Q 20/32* (2012.01)
*G06Q 20/38* (2012.01)

(52) U.S. Cl.
CPC ......... *G06Q 20/3674* (2013.01); *G06Q 20/20* (2013.01); *G06Q 20/322* (2013.01); *G06Q 20/3278* (2013.01); *G06Q 20/385* (2013.01)

(58) Field of Classification Search
CPC .. G06Q 20/3674; G06Q 20/20; G06Q 20/322; G06Q 20/3278; G06Q 20/385
See application file for complete search history.

(56) References Cited

U.S. PATENT DOCUMENTS

| 10,127,533 | B2 | 11/2018 | Andrews et al. | |
| 10,706,411 | B2 | 7/2020 | Pearson et al. | |
| 2012/0136796 | A1* | 5/2012 | Hammad | G06Q 20/3825 705/67 |
| 2013/0085835 | A1* | 4/2013 | Horowitz | G06Q 30/0207 705/14.1 |
| 2017/0061466 | A1 | 3/2017 | Srivastava | |
| 2017/0193543 | A1* | 7/2017 | Priebatsch | G06Q 20/3224 |

* cited by examiner

*Primary Examiner* — A. Hunter Wilder
(74) *Attorney, Agent, or Firm* — MARSHALL, GERSTEIN & BORUN LLP; Randall G. Rueth

(57) ABSTRACT

Example methods and apparatus for combining electronic payment and rewards redemption at retail points of sale are disclosed. A point of sale (POS) system may be configured to facilitate contactless payments while securing customer payment data. When a customer with a payment application installed on a mobile device initiates a transaction, the application obtains reference data associated with a customer account from an account services server of the POS. The reference data is then passed from the application of the mobile device to a POS terminal, such as by near field communication. Upon receiving the token, the POS terminal obtains customer payment data from the account services server and rewards program data for the customer from a rewards program server. Available rewards may be automatically applied prior to processing payment using the payment data to complete the contactless payment transaction.

19 Claims, 7 Drawing Sheets

CONTACTLESS USER IDENTIFICATION BY DIGITAL WALLET TO RETAILER POINT OF SALE

CROSS-REFERENCE TO RELATED APPLICATIONS

This application is a continuation of U.S. patent application Ser. No. 17/317,467, filed on May 11, 2021, the entirety of which is incorporated herein by reference.

FIELD OF THE DISCLOSURE

This disclosure relates generally to retail points of sale, and, more particularly, to methods and apparatus for combining electronic payment and rewards redemption at retail points of sale.

BACKGROUND

During checkout for a retail transaction at a point of sale (POS), customers currently have to enter their phone number in to a payment terminal or otherwise identify themselves as a rewards program member, manually select rewards benefits to redeem for payment, enter their zip code on the transaction terminal for account authentication in some cases, and then either pay with a credit card from their physical wallet or begin a separate process of payment using an electronic wallet application running on a mobile device. Such activities may deter customers from participating, partially or fully, in rewards programs and/or realizing their potential rewards program benefits. For example, some customers may limit their use of rewards programs that could otherwise provide information and incentives for improving their health in order to avoid carrying a physical rewards card or entering information on a pin pad or other payment terminal device, particularly for customers concerned about the spread of disease via contact with payment terminals. Moreover, retailers may not fully realize the benefits of loyal customers. Additionally, actual and perceived security risks associated with electronic wallets may discourage some customers from using such applications, which would otherwise allow secure contactless payment and reduce the spread of disease. Accordingly, there is a need for methods and apparatus that simplify the redemption of rewards benefits and the payment for a retail transaction.

SUMMARY

In an embodiment, a method for electronic payment and rewards redemption at a retail POS includes: generating, at an accounts services server, reference data for accessing cardholder data based on an identifier received from a mobile device; providing, by the accounts services server, the reference data to the mobile device; providing, by the mobile device, the reference data and the identifier to a POS system; accessing, by the POS system, the cardholder data from the accounts services server based on the reference data; obtaining, from a rewards program server by the POS system, rewards program data based on the identifier; applying, by the POS system, one or more rewards benefits to a transaction based on the rewards program data; and applying, by the POS system, the cardholder data to the transaction after the one or more rewards benefits are applied.

In another embodiment, a system for electronic payment and rewards redemption at a retail POS includes: a storage medium storing instructions that, when executed by a processor, execute an application on a mobile device associated with an identifier; a rewards program server configured to store rewards program data; an accounts services server and a POS system. The account services server may be configured to receive, from the application, the identifier, generate reference data representing cardholder data for a retail transaction based on the identifier, and provide the reference data to the application. The POS system may include one or more processors configured by computer-readable instructions to receive, from the application, the reference data and the identifier, access, from the accounts services server, the cardholder data based on the reference data, obtain, from the rewards program server, the rewards program data based on the identifier, apply one or more rewards benefits to the transaction based on the rewards program data, and apply the cardholder data to the transaction after the one or more rewards benefits are applied.

In another embodiment, a non-transitory, machine-readable, storage medium stores instructions that, when executed by one or more processors, cause a mobile device to pay for and redeem rewards benefits for a retail transaction at a retail POS system by: receiving, via a first interface from a mobile device, an identifier of the mobile device, and reference data identifying cardholder data for a retail transaction, the reference data determined by an accounts services server based on the identifier; obtaining, via a second interface from the accounts services server, the cardholder data based on the reference data; obtaining, using one or more processors, rewards program data based on the identifier; applying, using one or more processors, one or more rewards benefits to the transaction based on the rewards program data; and applying, using one or more processors, the cardholder data to the retail transaction after the one or more rewards benefits are applied.

In another embodiment, a method includes: providing, via a first interface of a mobile device, an identifier of the mobile device to an accounts services server; in response to providing the identifier, receiving via the first interface from the account services server, reference data representing cardholder data for a retail transaction, the reference data generated based on the identifier; and providing, via a second interface of the mobile device, the reference data and the identifier to a POS system, wherein the reference data and the identifier enable the POS system to access and apply one or more rewards program benefits and access and apply the cardholder data to the retail transaction.

In another embodiment, a method for payment and rewards redemption at a retail POS system includes: receiving, via a first interface from a mobile device, an identifier of the mobile device, and reference data identifying cardholder data for a retail transaction, the reference data determined by an accounts services server based on the identifier; obtaining, via a second interface from the accounts services server, the cardholder data based on the reference data; obtaining, using one or more processors, rewards program information based on the identifier; applying, using one or more processors, one or more rewards benefits to the transaction based on the rewards program information; and applying, using one or more processors, the cardholder data to the retail transaction after the one or more rewards benefits are applied.

In another embodiment, a non-transitory, machine-readable, storage medium stores instructions that, when executed by one or more processors, cause a POS system to pay for and redeem rewards benefits for a retail transaction by: receiving, via a first interface from a mobile device, an identifier of the mobile device, and reference data identifying cardholder data for a retail transaction, the reference data determined by an accounts services server based on the identifier; obtaining, via a second interface from the accounts services server, the cardholder data based on the reference data; obtaining, using one or more processors, rewards program data based on the identifier; applying, using one or more processors, one or more rewards benefits to the transaction based on the rewards program data; and applying, using one or more processors, the cardholder data to the retail transaction after the one or more rewards benefits are applied.

Figure 1:
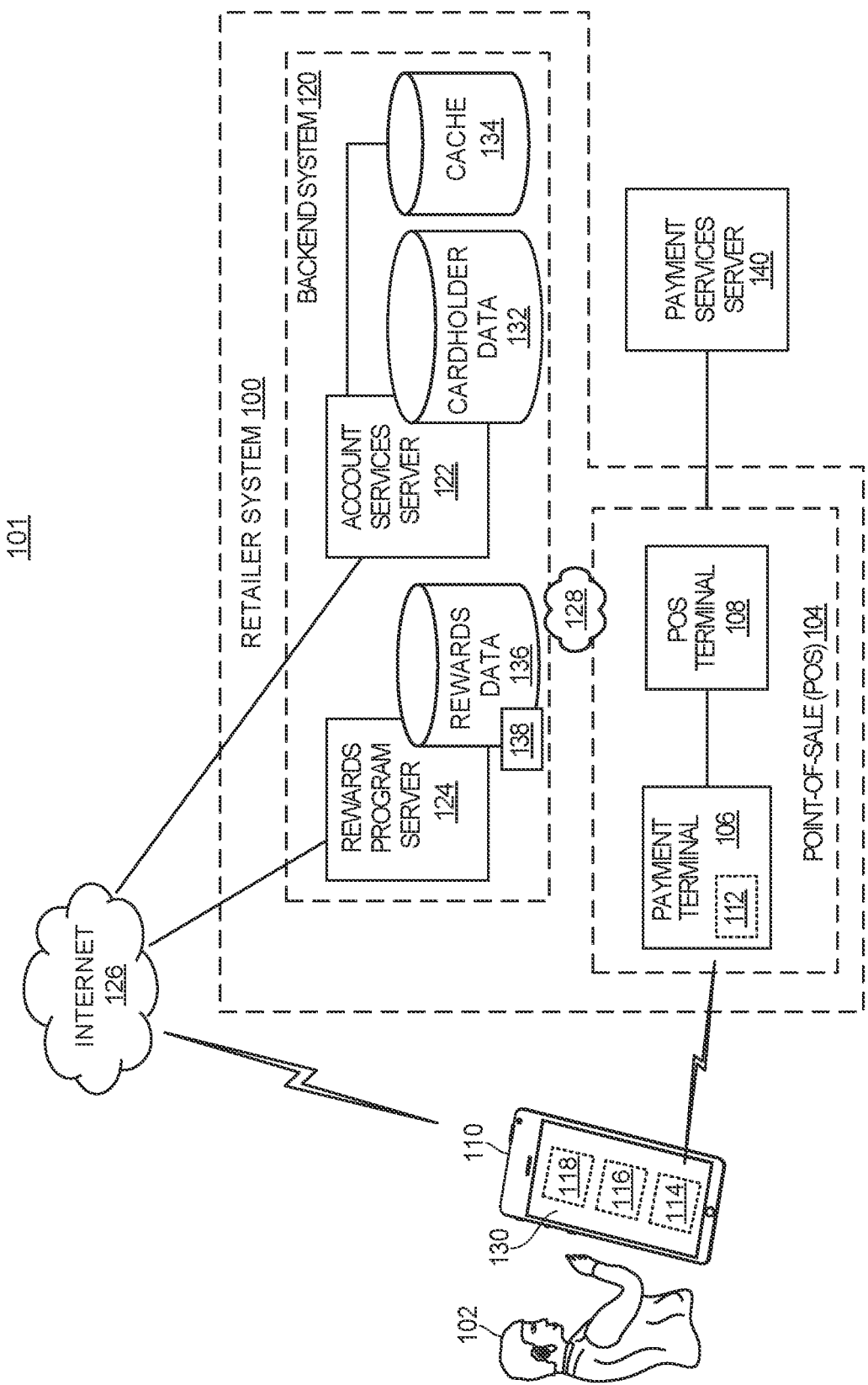
FIG. 1 illustrates an example retailer system configured, in accordance with disclosed embodiments, and shown in an example environment of use.

The figures depict embodiments of this disclosure for purposes of illustration only. One skilled in the art will readily recognize from the following discussion that alternate embodiments of the structures and methods illustrated herein may be employed without departing from the principles set forth herein. The figures are not drawn to scale.

In general, the same reference numbers will be used throughout the drawing(s) and accompanying written description to refer to the same or like parts. The figures are not to scale. Connecting lines or connectors shown in the various figures presented are intended to represent example functional relationships and/or physical or logical couplings between the various elements.

DETAILED DESCRIPTION

To reduce or eliminate some or all of the problems of conventional retail POS systems, example methods and apparatus for combining payment and rewards redemption at retailer POS systems are disclosed. Disclosed examples allow a customer to both redeem loyalty rewards benefits and make payment by simply opening a disclosed example application on their mobile device, clicking a "Pay Now" button (or some other similar button), and "tapping" their mobile device on a payment terminal of a retailer to initiate, for example, a near-field communication (NFC) transfer. Based on the transfer, a disclosed example POS system (e.g., a cash register) of the retailer automatically identifies the customer as a rewards program member, automatically redeems their rewards benefits (e.g., points, discounts, etc.) if available and so configured, and then pays any remaining balance of the transaction using cardholder data stored within the retailer's ecosystem.

With the use of NFC or other electronic transfer technologies (e.g., scanning a barcode), disclosed examples create a truly touchless checkout experience when both redeeming rewards benefits and making payment. Moreover, while existing digital wallets, such as Apple Pay and Google Pay, allow customers to present loyalty and payment card information to a POS system, these solutions do not combine loyalty identification, rewards redemption, customer authentication, and payment in a single tap. Further, in disclosed examples, no cardholder data (e.g., a credit card account number) needs to be stored on the mobile device. Instead, the application on the mobile device obtains an expiring piece of reference data, information, etc. that represents cardholder data from an account services server, and passes the expiring piece of reference data to a retailer's POS system, enabling the POS system to look up the cardholder data stored within the retailer's ecosystem. In some examples, the reference data transmitted from the mobile device to the POS system expires, e.g., every fifteen minutes, and cannot be used with other retailers. In addition to limiting time, some examples may limit the use of the rewards recognition and electronic payment to a single retailer (e.g., a single multi-site retailer), thereby further limiting the risk of loss should a customer's mobile device be stolen or compromised.

Accordingly, disclosed examples reduce the number of activities a customer needs to perform at the time of checkout, lessens customer/cashier interaction, lowers the likelihood of the customer touching potentially unclean surfaces, and/or creates a simple and secure touchless checkout experience. These and other aspects of the systems and methods described herein thus improve security and convenience, thereby encouraging customer use of such systems.

Reference will now be made in detail to non-limiting examples, some of which are illustrated in the accompanying drawings.

FIG. 1 is a schematic illustration of an example retailer system 100 configured to facilitate retail purchases and rewards program management in accordance with disclosed embodiments, and shown in an example environment of use 101. To enable a customer 102 to make payment and redeem rewards benefits, the example retailer system 100 includes an example POS system 104 having an example payment terminal 106 (e.g., a pin pad, chip reader, barcode reader, etc.) and a POS terminal 108 (e.g., a cash register, etc.). In some embodiments, a scanner or other input component may be integrated into or connected to the payment terminal 106 to capture or receive data relating to a retail transaction.

In the illustrated example of FIG. 1, the customer 102 uses a mobile device 110 to interact with the POS system 104 to, among possibly other things, make payment and redeem rewards benefits. Example mobile devices 110 include, but are not limited, a smartphone, a tablet computer, a smartwatch, a personal digital assistant (PDA), smart glasses, or any other wearable or mobile computing device.

To transfer the data, the payment terminal 106 includes any number and/or type(s) of transceiver(s) (e.g., an NFC transceiver 112), and the mobile device 110 includes any number and/or type(s) of transceiver(s) (e.g., an NFC transceiver 114). The example NFC transceivers 112, 114 are configured to transfer data when, for example, the NFC transceivers 112, 114 are brought near to each other in, for example, a so-called "tapping" motion.

To uniquely identify the mobile device 110, the example mobile device 110 has an assigned mobile equipment identifier (MEID) 116, which may be indelibly stored on the mobile device 110 at manufacture. In alternative embodiments, other identifiers of the mobile device 110, a user of the mobile device 110, or an account associated with the mobile device 110 or the user may additionally or alternatively be stored for use according to the methods disclosed herein.

To enable the customer 102 to make payment and redeem rewards benefits, the example mobile 110 includes one or more tangible machine-readable storage mediums (e.g., the program memory 704 of FIG. 7) storing instructions that, when executed by a processor (e.g., the processor 702 of FIG. 7), cause the mobile device 110 to execute a disclosed example mobile application 118. The mobile application 118 may be configured to generate user interfaces, receive and process user input, and perform aspects of the methods disclosed herein.

To provide back end services for the POS system 104, the example retailer system 100 includes an example back end system 120 having an example account services server 122 and an example rewards program server 124. In addition to the transceiver 114, the mobile device 110 is communicatively coupled to the account services server 122 and the rewards program server 124 via one or more public and/or private networks such as the Internet 126. The POS system 104 and the back end system 120 are communicatively coupled via one or more private networks 128 and/or other private and/or public networks such as the Internet 126. While the account services server 122 and the rewards program server 124 are typically implemented separately on different servers, they may be implemented on the same server (e.g., as modules and/or applications executing on the same physical server or server group). The account services server 122 and/or the rewards program server 124 may be implemented by virtual machines hosted by a cloud services provider. In some examples, the account services server 122 is implemented by more than one server. In some examples, the rewards program server 124 is implemented by more than one server.

While an example retailer system 100 and an example environment of use 101 are shown in FIG. 1, one or more of the elements, devices and/or systems illustrated in FIG. 1 may be combined, divided, re-arranged, omitted, eliminated or implemented in any other way. Further, the retailer system 100 and/or the environment of use 101 may include one or more elements, devices and/or systems in addition to, or instead of, those illustrated in FIG. 1, or may include more than one of any or all of the illustrated elements, devices and/or systems.

Figure 2:
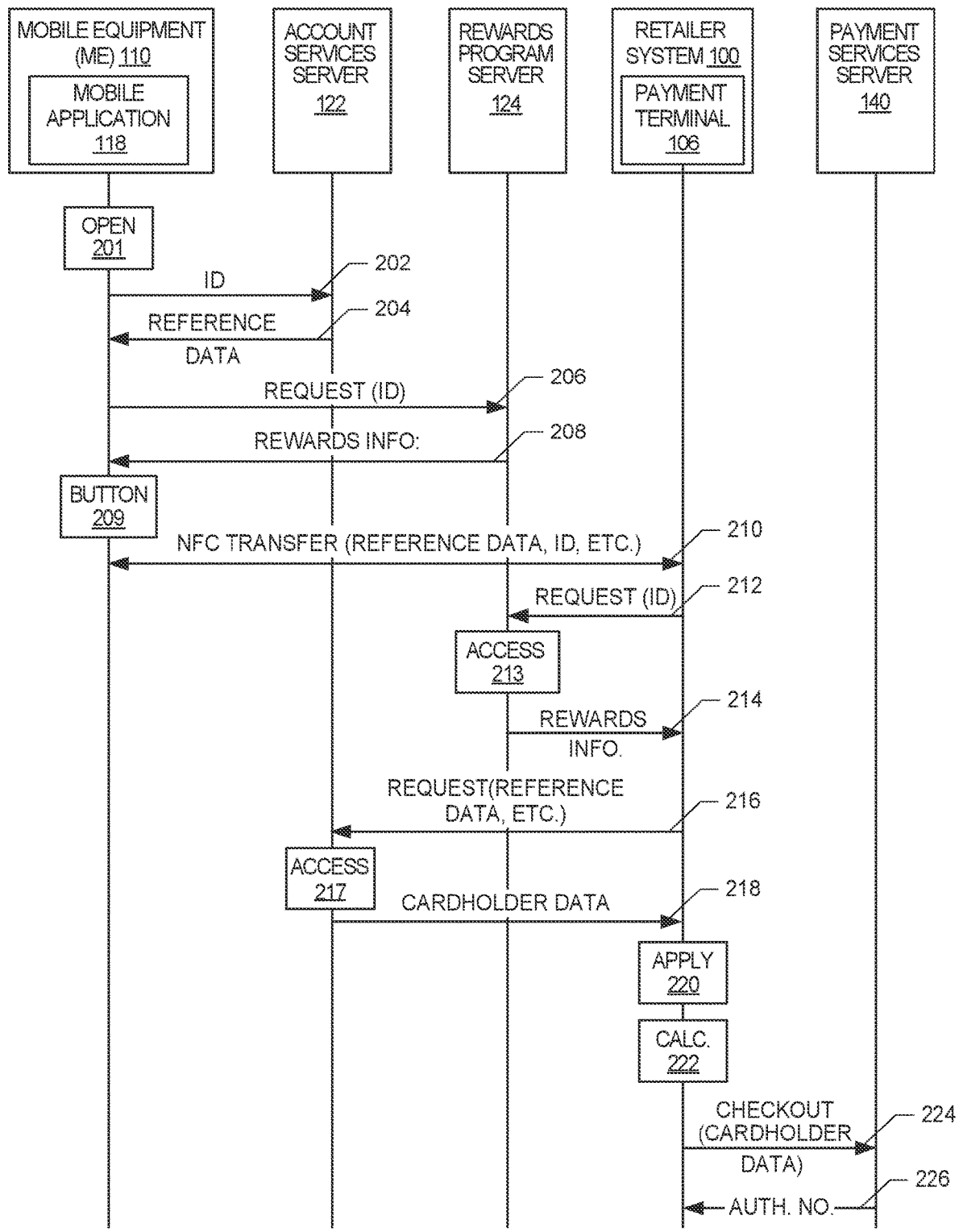
FIG. 2 is a diagram illustrating an example use case for the illustrated example of FIG. 1.

FIG. 2 is a diagram illustrating example interactions of an example use case of the devices and systems of FIG. 1 to make a combined rewards benefits redemption and retail transaction payment via a single tap of the mobile device 110. The example interactions of FIG. 2 begin when the application 118 is started, pulled up, opened, activated, etc. (block 201).

Upon being opened, the application 118 may present, possibly among other things, a button (e.g., selectable part of, a portion of, etc. a graphical user interface (GUI) presented on a display 130 (FIG. 1) of the mobile device 110) that initiates both payment and awards benefits redemption for a retail transaction. When the button is selected (e.g., activated) or the process is otherwise triggered (e.g., upon opening or refreshing the application 118), the application 118 sends an identifier (e.g., the MEID 116) and/or user account credentials to the account services server 122 in an identification message 202. The user account credential may identify the application 118 as being associated with a user account of the customer 102, such as by including a user account identifier (user ID). In some such examples, the user account credentials may include a user password or persistent token to authenticate the user account to the account services server 122. In response, the account services server 122 identifies cardholder data (e.g., a credit card account number, etc.) in a cardholder data datastore 132 based upon the received identifier (e.g., the MEID 116 and/or a user ID) for the transaction, and generates expiring reference data (e.g., a secure token, a key used to encrypt, secure, authenticate, etc. a secure token, expiration data, a security code, a time-to-live (TTL) for the reference data, etc.) that represents and/or may be used by the POS terminal 108 to access and/or unlock the cardholder data in a message 204. In some examples, the MEID 116 may be used by the account services server 122 to identify a user account based upon a previous association of the mobile device 110 with the user account, such as when the customer 102 first installed the application 118 on the mobile device 110. In further examples, both the MEID 116 and additional user credentials may be used to identify the user account of the customer 102 in order to further improve security. The account services server 122 sends the reference data in the response message 204 to the application 118. In some examples, an identifier for the application 118 is sent with the MEID 116 to the account services server 122 in the identification message 202 to enable identification, verification, etc. of the application 118 as being associated with the account services server 122 (e.g., provided by the same retailer or retail entity, or entities on behalf of the same retailer or retail entity). In some examples, identifier (e.g., the MEID 116 and/or a user ID) and the reference data are exchanged with the account services server 122 via an application programming interface (API) of the account services sever 122. The API may be configured to receive messages formatted using JavaScript Object Notation (JSON), an extensible markup language (XML), etc.

In some examples, the application 118 optionally requests (by sending a message 206) rewards benefits information (e.g., available points, discounts, etc.) from the rewards program server 124 based on the identifier, which is abbreviated as ID in the drawings, (e.g., the MEID 116 and/or a user ID). In response, the rewards benefits information is returned from the rewards program server 124 in a message 208 and may be displayed in a GUI on the display 130 to enable the customer 102 to select, for example, how many rewards benefits to apply to the transaction. In some examples, if the customer 102 provides no selection, all available rewards benefits are automatically applied, by default.

When the customer 102 taps the mobile device 110 to the payment terminal 106 or otherwise initiates a payment process at block 209, the NFC transceiver 114 transfers the identifier (e.g., the MEID 116 and/or a user ID), the reference data and rewards benefit selections, if any, from the application 118 to the transceiver 112 of the retailer system 100 via the payment terminal 106 (line 210). In some examples, the identifier, the reference data and the rewards benefit selections are transferred in the same NFC transfer, transaction, etc. In some examples, an identifier for the application 118 is also sent with the identifier and reference data to the retailer system 100 to enable identification, verification, etc. of the application 118 as being associated with the account services server 122 and/or the retailer system 100 (e.g., provided by the same retailer or retail entity, or entities on behalf of the same retailer or retail entity). Such application identifier may be used to distinguish the application 118 from other applications that may communicate with the payment terminal 106 (e.g., electronic wallet applications). For security purposes, the cardholder data need not be stored on or accessible to the mobile device 110. In some examples, the reference data defines a barcode that the application 118 displays on the display 130, and the POS terminal 108 scans the barcode to obtain, access, etc. the reference data.

The retailer system 100 (e.g., the POS terminal 108) sends a request 212, which includes the identifier (e.g., the MEID 116 and/or a user ID), to the rewards program server 124. In response, the rewards program server 124 queries a rewards data datastore 136 based on the user ID or the identifier to access, obtain, identify, etc. the customer's rewards benefits information (block 213), and sends a response 214 containing the customer's rewards benefits information to the retailer system 100 (e.g., the POS terminal 108).

The retailer system 100 (e.g., the POS terminal 108) sends a request 216, which includes the reference data, for cardholder data to the account services server 122. In response, the account services server 122 uses the reference data to access, obtain, unlock, etc. cardholder data in the cardholder data datastore 132 (block 217), and sends the cardholder data to the retailer system 100 (e.g., the POS terminal 108) in a response 218. In some examples, the reference data may be used over a period of time for more than one transaction and the account services server 122, thus, stores the cardholder data in a cache 134.

The retailer system 100 (e.g., the POS terminal 108) applies available rewards benefits to the transaction (block 220), according to applicable rules or preferences of the customer 102, and calculates the amount due after the rewards benefits are applied (block 222). In some examples, the rewards benefits are applied according to one or more pre-defined rules 138 defined, configured, selected, etc. by one or more user inputs of the customer 102 and/or the retailer associated with the retailer system 100. Example rules may include the following: apply all rewards benefits available and/or applicable, rewards benefits cannot be applied to certain items such as alcohol or tobacco, use rewards benefits to reduce cost of each transaction by a specified percent or value, apply a specified percent or value of rewards benefits to each transaction, etc.

As may be conventional, the retailer system 100 (e.g., the POS terminal 108) sends a checkout request 224 including the cardholder data to a payment services server 140 that provides the account associated with the cardholder data to complete the checkout, payment, etc. for the transaction. Following processing of the payment by the payment services server 140, the retailer system 100 receives a transaction authorization response 226 containing an authorization number indicating payment has been made.

When an additional retail transaction is to be completed and the reference data has not expired, the application 118 may send the reference data to the retailer system 100 to facilitate access to payment information by the retailer system 100 for the additional transaction, which may proceed as described above. If the reference data has expired, the application 118 obtains new reference data from the account services server 122 for the additional transaction.

While an example use case for the illustrated example of FIG. 1 is shown in FIG. 2, one or more of the data, interactions, transactions, requests, responses, etc. illustrated in FIG. 2 may be combined, divided, re-arranged, omitted, eliminated or implemented in any other way. For example, the order of the data, interactions, transactions, requests, responses, etc. may be changed. For instance, the interactions 216 and 218 could be performed prior to the interactions 212 and 214, or such interactions may occur concurrently. Further, a use case may include one or more data, interactions, transactions, requests, responses, etc. in addition to, or instead of, those illustrated in FIG. 2, or may include more than one of any or all of the illustrated data, transactions, requests, responses, etc.

Figure 3:
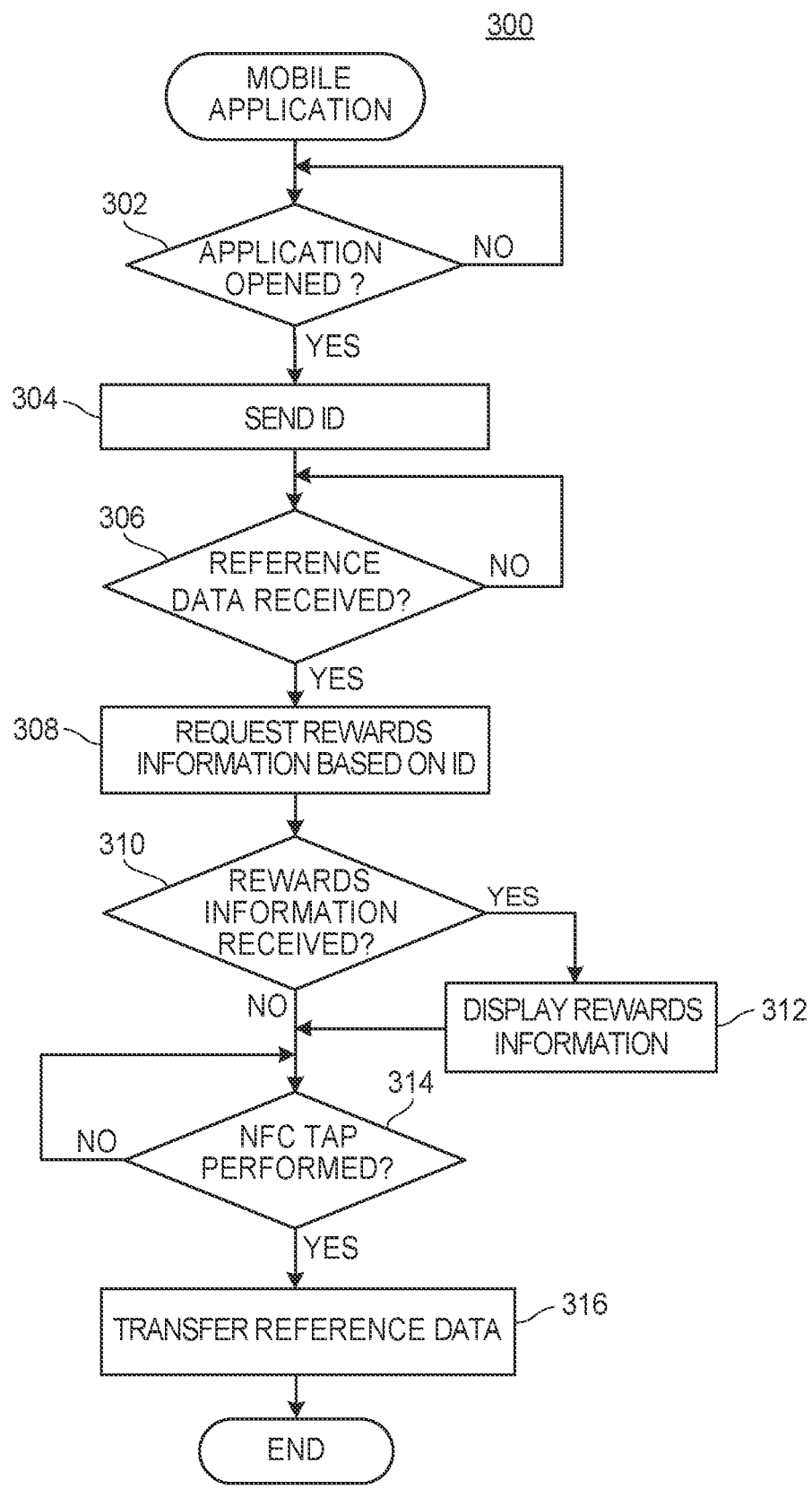
FIG. 3 is a flowchart representative of an example method, hardware logic or machine-readable instructions for implementing the example mobile device of FIG. 1, in accordance with disclosed embodiments.

FIG. 3 is a flowchart 300 representative of example processes, methods, software, machine-readable instructions, etc. for implementing the mobile application 118. The processes, methods, software and instructions may be an executable program or portion of an executable program for execution by a processor such as the processor 702 of FIG. 7. The program may be embodied in software and/or instructions stored on a tangible, non-transitory, machine-readable storage medium such as a hard disk drive (HDD), a cache, a flash memory, a read-only memory (ROM), a random access memory (RAM), or any other storage device or storage disk associated with the processor 702 in which information is stored for any duration (e.g., for extended time periods, permanently, for brief instances, for temporarily buffering, and/or for caching of the information). Further, although an example program is described with reference to the flowchart illustrated in FIG. 3, many other methods of implementing the mobile application 118 may alternatively be used. For example, the order of execution of the blocks may be changed, and/or some of the blocks described may be changed, eliminated, or combined. Additionally, or alternatively, any or all of the blocks may be implemented by one or more hardware circuits (e.g., discrete and/or integrated analog and/or digital circuitry, an application specific integrated circuit (ASIC), a programmable logic device (PLD), a field programmable gate array (FPGA), a field programmable logic device (FPLD), a logic circuit, etc.) structured to perform the corresponding operation without executing software or instructions.

The example flowchart 300 of FIG. 3 begins when a mobile application (e.g., the mobile application 118) is opened, activated, started, etc. (block 302). When the application is opened (block 302), the application sends an identifier (e.g., a user ID and/or the MEID 116) to an account services server (e.g., the account services server 122) (block 304) and waits to receive reference data from the account services server (block 306). In some examples, the application may prompt the user of the mobile device for a password, numeric PIN, fingerprint, or other means of verifying authorization in order to prevent misuse of the application by an unauthorized user, such as in the event of the mobile device being lost or stolen.

When the reference data is received (block 306), the application optionally requests rewards benefits information based on the identifier (e.g., the MEID 116 and/or a user ID) from a rewards program server (e.g., the rewards program server 124) (block 308), and waits to receive the rewards benefits information (block 310). If rewards benefits information is optionally requested and received at blocks 308 and 310, respectively, the application may display the rewards benefits information on, for example, the display 130 of the mobile device 110 (block 312).

When a customer (e.g., the customer 102) performs a tap of a mobile device (e.g., the mobile device 110) executing the application to a payment terminal (e.g., the payment terminal 106) (block 314) prior to the expiration of the reference data, transceivers (e.g., the NFC transceivers 112 and 114) communicate to transfer the reference data from the mobile device to a POS terminal (e.g., the POS terminal 108) via the payment terminal (block 316). If rewards benefits information is optionally requested and received at blocks 308 and 310, respectively, the application may optionally (not shown for clarity of illustration) accept user input(s) selecting rewards benefits to apply and forward such user input(s) to the POS terminal via the transceivers and the payment terminal 108, in some examples, prior to transferring the reference data from the mobile device to a POS terminal via the payment terminal. Control then exits from the example flowchart 300 of FIG. 3.

Figure 4:
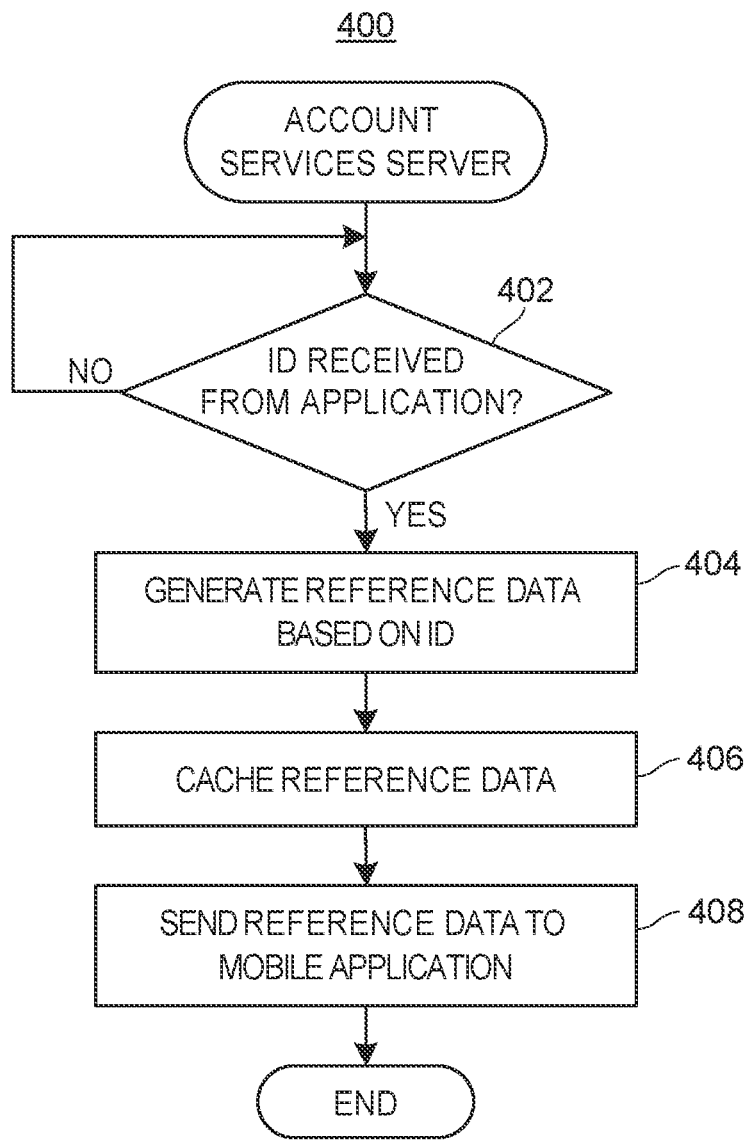
FIG. 4 is a flowchart representative of an example method, hardware logic or machine-readable instructions for implementing the example account services server of FIG. 1, in accordance with disclosed embodiments.

FIG. 4 is a flowchart 400 representative of example hardware logic, machine-readable instructions, hardware implemented state machines, and/or any combination thereof for implementing the account services server 122. The machine-readable instructions may be an executable program or portion of an executable program for execution by a computer processor such as the processor 702 shown in the example processor platform 700 discussed below in connection with FIG. 7. The program may be embodied in software stored on a tangible, non-transitory, machine-readable storage medium such as a HDD, a cache, a flash memory, a read-only memory (ROM), a random access memory (RAM), or any other storage device or storage disk or memory associated with the processor 702, but the entire program and/or parts thereof could alternatively be executed by a device other than the processor 702 and/or embodied in firmware or dedicated hardware. Further, although the example program is described with reference to the flowchart 400 illustrated in FIG. 4, many other methods of implementing the account services server 122 may alternatively be used. For example, the order of execution of the blocks may be changed, and/or some of the blocks described may be changed, eliminated, or combined. Additionally, and/or alternatively, any or all of the blocks may be implemented by one or more hardware circuits (e.g., discrete and/or integrated analog and/or digital circuitry, an FPGA, an ASIC, a PLD, an FPLD, a comparator, an operational-amplifier (op-amp), a logic circuit, etc.) structured to perform the corresponding operation without executing software or firmware.

The example flowchart 400 begins with the account services server 122 waiting to receive an identifier (e.g., a user ID and/or the MEID 116) from an application (e.g., the application 118) executing on a mobile device (e.g., the mobile device 110) (block 402). In response, the account services server 122 identifies cardholder data in a cardholder data datastore (e.g., the cardholder data datastore 132) based upon the received identifier for the transaction, and generates expiring reference data that represents and/or may be used by a POS terminal (e.g., the POS terminal 108) to access and/or unlock the cardholder data (block 404). The expiring reference data may comprise a token containing an encrypted reference to a user account, which token may be set to expire after a short interval (e.g., after fifteen minutes). In some examples, the cardholder data may be used over a period of time for more than one transaction and the account services server stores the cardholder data in a cache (e.g., the cache 134) (block 406). The account services server 122 sends the reference data to the application (block 408), and control exits from the example flowchart 400. In some examples, an identifier for the application is sent with the identifier to the account services server 122 to enable the identification, verification, etc. of the application as being associated with the account services server 122 (e.g., provided by the same retailer or retail entity, or entities on behalf of the same retailer or retail entity). In further examples, the account services server may also send rewards information, which may include obtaining rewards information from a rewards program server (e.g., the rewards program server 124).

Figure 5:
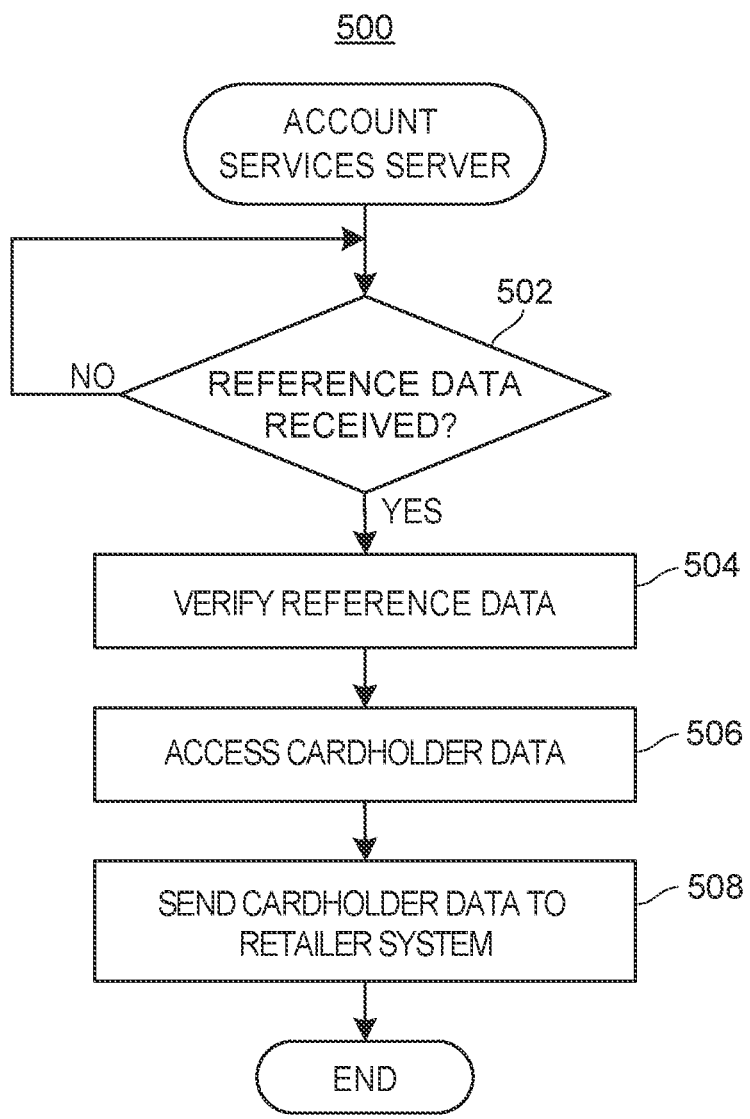
FIG. 5 is a flowchart representative of an example method, hardware logic or machine-readable instructions for implementing the example account services server of FIG. 1, in accordance with disclosed embodiments.

FIG. 5 is a flowchart 500 representative of other example hardware logic, machine-readable instructions, hardware implemented state machines, and/or any combination thereof for implementing the account services server 122. The machine-readable instructions may be an executable program or portion of an executable program for execution by a computer processor such as the processor 702 shown in the example processor platform 700 discussed below in connection with FIG. 7. The program may be embodied in software stored on a tangible, non-transitory, machine-readable storage medium such as a HDD, a cache, a flash memory, a read-only memory (ROM), a random access memory (RAM), or any other storage device or storage disk or memory associated with the processor 702, but the entire program and/or parts thereof could alternatively be executed by a device other than the processor 702 and/or embodied in firmware or dedicated hardware. Further, although the example program is described with reference to the flowchart 500 illustrated in FIG. 5, many other methods of implementing the account services server 122 may alternatively be used. For example, the order of execution of the blocks may be changed, and/or some of the blocks described may be changed, eliminated, or combined. Additionally, and/or alternatively, any or all of the blocks may be implemented by one or more hardware circuits (e.g., discrete and/or integrated analog and/or digital circuitry, an FPGA, an ASIC, a PLD, an FPLD, a comparator, an operational-amplifier (op-amp), a logic circuit, etc.) structured to perform the corresponding operation without executing software or firmware.

The example flowchart 500 of FIG. 5 begins with the account services server 122 waiting to receive reference data from a retailer system (e.g., the POS terminal 108) (block 502). When reference data is received (block 502), the reference data is verified (block 504). For example, a secure token included in the reference data is verified with a key included in the reference data. The account services server 122 uses the reference data to access, obtain, unlock, etc. cardholder data in a cardholder data datastore (e.g., the cardholder data datastore 132) (block 506), and sends the cardholder data to the retailer system (block 508). In some examples, the account services server 122 may further access and send rewards information associated with the customer account to the retailer system, which rewards information may be accessed by communication with the rewards program server 124. Control then exits from the example flowchart 500. In some examples, the reference data may be used over a period of time for more than one transaction and the account services server stores the cardholder data in a cache (e.g., the cache 134).

Figure 6:
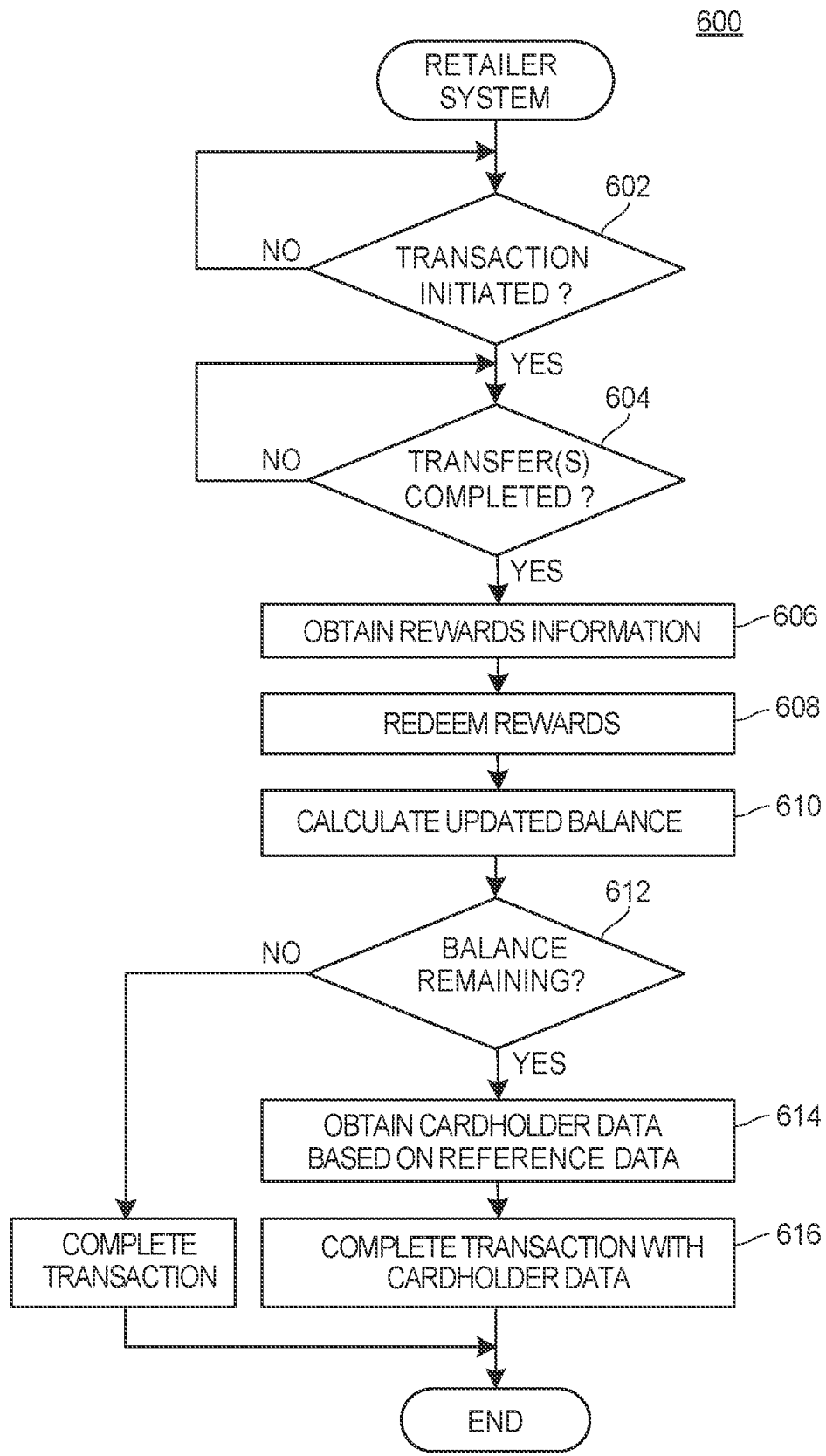
FIG. 6 is a flowchart representative of an example method, hardware logic or machine-readable instructions for implementing the example POS system of FIG. 1, in accordance with disclosed embodiments.

FIG. 6 is a flowchart 600 representative of example hardware logic, machine-readable instructions, hardware implemented state machines, and/or any combination thereof for implementing the retailer system 100. The machine-readable instructions may be an executable program or portion of an executable program for execution by a computer processor such as the processor 702 shown in the example processor platform 700 discussed below in connection with FIG. 7. The program may be embodied in software stored on a tangible, non-transitory, machine-readable storage medium such as a HDD, a cache, a flash memory, a read-only memory (ROM), a random access memory (RAM), or any other storage device or storage disk or memory associated with the processor 702, but the entire program and/or parts thereof could alternatively be executed by a device other than the processor 702 and/or embodied in firmware or dedicated hardware. Further, although the example program is described with reference to the flowchart 600 illustrated in FIG. 6, many other methods of implementing the retailer system 100 may alternatively be used. For example, the order of execution of the blocks may be changed, and/or some of the blocks described may be changed, eliminated, or combined. Additionally, and/or alternatively, any or all of the blocks may be implemented by one or more hardware circuits (e.g., discrete and/or integrated analog and/or digital circuitry, an FPGA, an ASIC, a PLD, an FPLD, a comparator, an operational-amplifier (op-amp), a logic circuit, etc.) structured to perform the corresponding operation without executing software or firmware.

The example flowchart 600 begins with the retailer system 100 (e.g., the POS terminal 108) waiting for a transaction to the initiated (block 602) and for a transfer of reference data to be completed (block 604). The transaction and transfer may be initiated by the mobile device 110, such as by NFC communication or presenting a data-encoding graphical symbol (e.g., a bar code) to a scanner of the POS terminal 108.

The POS terminal 108 sends a request including an identifier associated with the customer 102 (e.g., a user ID and/or the MEID 116) to the rewards program server 124 and receives rewards benefits information (block 606). The obtained rewards benefits information may include rules governing the use of rewards benefits, which may include customer-specified rules or preferences. The POS terminal 108 applies rewards benefits to the transaction according to any applicable rules (block 608), and calculates an amount due after the rewards benefits are applied (block 610). Thus, part or all of the available rewards benefits may be automatically applied when the mobile device initiates an electronic payment transaction, without requiring the customer 102 to enter any account, payment, or other data relating to rewards or payment into the mobile device 110 at the time of the POS transaction. Of course, a PIN or password may notwithstanding be used to secure access to the mobile device 110 or the application 118. The POS terminal 108 is instead configured to obtain and apply rewards benefits automatically, according to any default or user-specified rules defined by the customer 102 (which the customer 102 may have selected or configured in advance of the POS transaction and applying to all such POS transactions until changed by the customer 102).

If a balance remains (block 612), the retailer system 100 sends the reference data to an account services server (e.g., the account services server 122) to obtain cardholder data for the transaction (block 614). Upon receiving the cardholder data, the retailer system 100 sends the cardholder data to a payment processing server (e.g., the payment services server 140) that provides the account associated with the cardholder data to complete the checkout, payment, etc. for the transaction by (block 616). Control then exits from the example flowchart 600. Returning to block 612, if a balance does not remain (block 612), the transaction is completed without processing a payment (block 618). In some examples, the retailer system 100 may further send a confirmation message to the mobile device 110 for immediate or later review by the customer 102, such as a receipt for the transaction. Such confirmation message may include information regarding the transaction (e.g., rewards benefits applied and payment processed), which may include an authorization number or confirmation number received by the retailer system 100 from the payment processing server.

Figure 7:
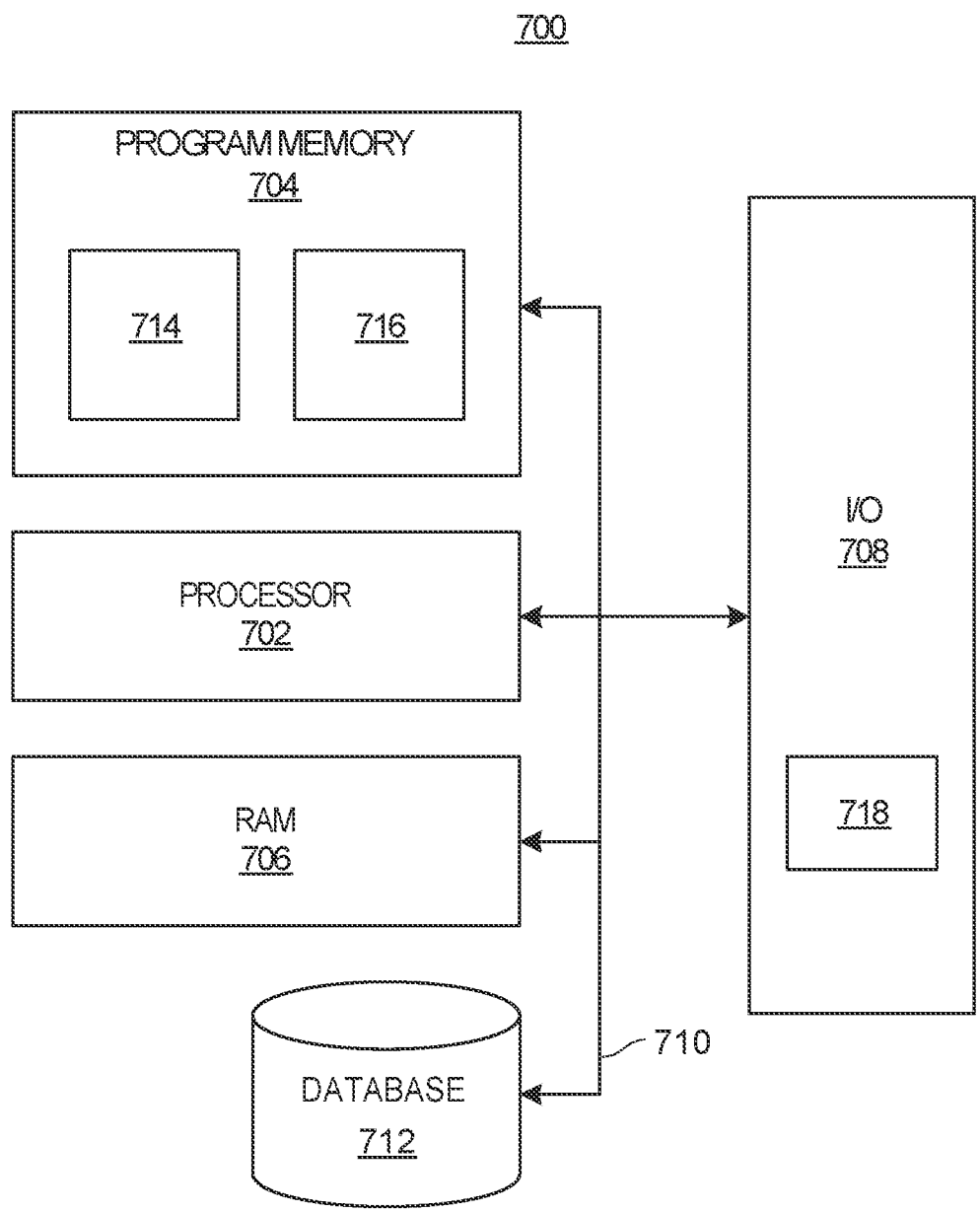
FIG. 7 is a block diagram of an example computing system to implement the various user interfaces, methods, functions, etc., for combining payment and rewards redemption at retail points of sale, in accordance with disclosed embodiments.

FIG. 7 is a block diagram of an example computing system 700, in accordance with described embodiments. The example computing system 700 may be used to, for example, implement all or part of the payment terminal 106, the POS terminal 108, the mobile device 110, the account services server 122 and/or the rewards program server 124. The computing system 700 may be, for example, a server, a personal computer, a workstation, a mobile device (e.g., a cell phone, a smart phone, a tablet such as an IPAD™), a personal digital assistant (PDA), an Internet appliance, a headset or other wearable device, or any other type of computing device The computing system 700 includes a processor 702, a program memory 704, a RAM 706, and an input/output (I/O) circuit 708, all of which are interconnected via an address/data bus 710. The program memory 704 may store software and/or machine-readable instructions, which may be executed by the processor 702. It should be appreciated that although FIG. 7 depicts only one processor 702, the computing system 700 may include multiple processors 702. The processor 702 of the illustrated example is hardware, and may be a semiconductor based (e.g., silicon based) device. Example processors 702 include a programmable processor, a programmable controller, a graphics processing unit (GPU), a digital signal processor (DSP), an ASIC, a PLD, an FPGA, an FPLD, etc. In this example, the processor implements the payment terminal 106, the POS terminal 108, the mobile device 110, the account services server 122 and/or the rewards program server 124.

The program memory 704 may include volatile and/or non-volatile memories, for example, one or more RAMs (e.g., a RAM 714) or one or more program memories (e.g., a ROM 716), or a cache (not shown) storing one or more corresponding software and/or machine-readable instructions. For example, the program memory 704 may store software and/or machine-readable instructions that may be executed by the processor 702 to implement any of the payment terminal 106, the POS terminal 108, the mobile device 110, the account services server 122 and/or the rewards program server 124. Modules, systems, etc. instead of and/or in addition to those shown in FIG. 7 may be implemented. The software and/or machine-readable instructions may be stored on separate tangible, non-transitory, machine-readable storage mediums or disks, or at different physical locations.

Example memories 704, 714, 716 include any number or type(s) of volatile or non-volatile tangible, non-transitory, machine-readable storage medium or disk, such as a semiconductor memories, magnetically readable memories, optically readable memories, a HDD, an optical storage drive, a solid-state storage device, a solid-state drive (SSD), a read-only memory (ROM), a random-access memory (RAM), a compact disc (CD), a CD-ROM, a DVD, a Blu-ray disk, a redundant array of independent disks (RAID) system, a cache, a flash memory, or any other storage device or storage disk in which information may be stored for any duration (e.g., permanently, for an extended time period, for a brief instance, for temporarily buffering, for caching of the information, etc.).

As used herein, the term non-transitory, machine-readable medium is expressly defined to include any type of machine-readable storage device and/or storage disk and to exclude propagating signals and to exclude transmission media. A machine-readable medium may store machine-readable or computer-readable instructions that may be executed by one or more processors, such as the processor 702, to cause an associated computing system (e.g., the computer system 700) to perform various operations.

In some embodiments, the processor 702 may also include, or otherwise be communicatively connected to, a database 712 or other data storage mechanism (one or more hard disk drives, optical storage drives, solid state storage devices, CDs, CD-ROMs, DVDs, Blu-ray disks, etc.). In the illustrated example, the database 712 may store the cardholder data datastore 132, the cache 134 and/or the rewards data datastore 136.

Although FIG. 7 depicts the I/O circuit 708 as a single block, the I/O circuit 708 may include a number of different types of I/O circuits or components that enable the processor 702 to communicate with peripheral I/O devices. Example interface circuits 708 include an Ethernet interface, a universal serial bus (USB), a Bluetooth® interface, a near field communication (NFC) interface, and/or a PCI express interface. The peripheral I/O devices may be any desired type of I/O device such as a keyboard, a display (a liquid crystal display (LCD), a cathode ray tube (CRT) display, a light emitting diode (LED) display, an organic light emitting diode (OLED) display, an in-place switching (IPS) display, a touch screen, etc.) such as the display 130, a navigation device (a mouse, a trackball, a capacitive touch pad, a joystick, etc.), a speaker, a microphone, a printer, a button, a communication interface such as the transceiver 112 and/or the transceiver 114, an antenna, etc.

The I/O circuit 708 may include a number of different network transceivers 718 that enable the computing system 700 to communicate with another computer system, such as one or more additional computing systems 700 that implement other portions of the payment terminal 106, the POS terminal 108, the mobile device 110, the account services server 122 and/or the rewards program server 124 via a network (e.g., a communication network such as the Internet 126 and/or the network(s) 128). The network transceiver 718 may be a wireless fidelity (Wi-Fi) transceiver, a Bluetooth® transceiver, an infrared transceiver, a cellular transceiver, an Ethernet network transceiver, an asynchronous transfer mode (ATM) network transceiver, a digital subscriber line (DSL) modem, a dialup modem, a satellite transceiver, a cable modem, etc.

Use of "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise. A device or structure that is "configured" in a certain way is configured in at least that way, but may also be configured in ways that are not listed.

Further, as used herein, the expressions "in communication," "coupled" and "connected," including variations thereof, encompasses direct communication and/or indirect communication through one or more intermediary components, and does not require direct mechanical or physical (e.g., wired) communication and/or constant communication, but rather additionally includes selective communication at periodic intervals, scheduled intervals, aperiodic intervals, and/or one-time events. The embodiments are not limited in this context.

Further still, unless expressly stated to the contrary, "or" refers to an inclusive or and not to an exclusive or. For example, "A, B or C" refers to any combination or subset of A, B, C such as (1) A alone, (2) B alone, (3) C alone, (4) A with B, (5) A with C, (6) B with C, and (7) A with B and with C. As used herein, the phrase "at least one of A and B" is intended to refer to any combination or subset of A and B such as (1) at least one A, (2) at least one B, and (3) at least one A and at least one B. Similarly, the phrase "at least one of A or B" is intended to refer to any combination or subset of A and B such as (1) at least one A, (2) at least one B, and (3) at least one A and at least one B.

Moreover, in the foregoing specification, specific embodiments have been described. However, one of ordinary skill in the art appreciates that various modifications and changes can be made in view of aspects of this disclosure without departing from the scope of the invention as set forth in the claims below. Accordingly, the specification and figures are to be regarded in an illustrative rather than a restrictive sense, and all such modifications made in view of aspects of this disclosure are intended to be included within the scope of present teachings.

Additionally, the benefits, advantages, solutions to problems, and any element(s) that may cause any benefit, advantage, or solution to occur or become more pronounced are not to be construed as a critical, required, or essential features or elements of any or all the claims.

Furthermore, although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

Finally, any references, including, but not limited to, publications, patent applications, and patents cited herein are hereby incorporated in their entirety by reference to the same extent as if each reference were individually and specifically indicated to be incorporated by reference and were set forth in its entirety herein.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method for electronic payment and rewards redemption at a retail point of sale (POS), the method comprising:
  providing, by an accounts services server to a mobile device via an electronic communication network, reference data for accessing cardholder data associated with a user account based on an identifier received from the mobile device;
  receiving, at a POS system, the reference data and the identifier from the mobile device;
  obtaining, by the POS system via the electronic communication network, rewards program data from a rewards program server based on the identifier;
  applying, by the POS system, one or more rewards benefits to a transaction based on the rewards program data;

obtaining, by the POS system via the electronic communication network, the cardholder data from the accounts services server based on the reference data, wherein the cardholder data includes a payment account number and the reference data does not include the payment account number; and applying, by the POS system, the cardholder data to the transaction by electronic communication via the electronic communication network with a payment services server of a payment services network to obtain payment associated with the transaction.

2. The method of claim 1, further comprising:
verifying, by the POS system, an application of the mobile device based on an application identifier of an application of the mobile device.

3. The method of claim 1, further comprising generating, by the accounts services server, the reference data based on the identifier received from the mobile device, wherein the reference data includes a secure token.

4. The method of claim 1, wherein the POS system obtains the reference data and the identifier in a single transfer.

5. The method of claim 1, wherein the rewards program data includes one or more rules representing how the one or more rewards benefits are to be applied by the POS system, and further comprising applying, at the POS system, the one or more rewards benefits to the transaction based on the one or more rules.

6. The method of claim 5, further comprising at least one of defining or configuring, by the POS system, the one or more rules based on one or more user inputs received from the mobile device.

7. The method of claim 5, wherein at least one of the one or more rules identifies an item category to which the one or more rewards benefits may not be applied.

8. The method of claim 1, wherein:
at least some of the reference data is temporary reference data that expires after a period of time; and
obtaining the cardholder data comprises sending the temporary reference data to the accounts services server and receiving the cardholder data in a response from the accounts services server.

9. The method of claim 1, wherein the POS system receives the reference data and the identifier from the mobile device via a near field communication transfer.

10. A system for electronic payment and rewards redemption at a retail point of sale (POS), the system comprising:
an accounts services server configured to communicate with the POS system via an electronic communication network and comprising one or more processors configured by executable instructions to:
provide reference data for accessing cardholder data associated with a user account to a mobile device via the electronic communication network based on an identifier received from the mobile device; and
provide the cardholder data to POS systems via the electronic communication network upon receipt of the reference data from such POS systems; and
a POS system communicatively connected to the accounts services server via the electronic communication network and comprising one or more processors configured by computer-readable instructions to:
receive the reference data and the identifier from the mobile device;
obtain rewards program data from a rewards program server via the electronic communication network based on the identifier;
apply one or more rewards benefits to a transaction based on the rewards program data;
obtain the cardholder data from the accounts services server via the electronic communication network based on the reference data, wherein the cardholder data includes a payment account number and the reference data does not include the payment account number; and
apply the cardholder data to the transaction by electronic communication via the electronic communication network with a payment services server of a payment services network to obtain payment associated with the transaction.

11. The system of claim 10, wherein the accounts services server is further configured to generate the reference data based on the identifier received from the mobile device, wherein the reference data comprises a secure token.

12. The system of claim 10, further comprising the rewards program server, wherein the rewards program server comprises one or more processors configured by machine-readable instructions to:
store the rewards program data; and
provide the rewards program data to the POS systems upon receipt of the identifier from such POS systems.

13. The system of claim 10, wherein:
at least some of the reference data is temporary reference data that expires after a period of time; and
the POS system is further configured to obtain the cardholder data from the accounts services server based on the reference data for an additional retail transaction during the period of time.

14. The system of claim 10, wherein the POS system includes a near field transceiver to receive the reference data and the identifier from the mobile device.

15. A non-transitory, machine-readable, storage medium storing instructions for electronic payment and rewards redemption at a retail point of sale (POS) that, when executed by one or more processors of a POS system, cause the POS system to:
receive reference data for accessing cardholder data associated with a user account and an identifier from a mobile device, wherein the reference data is associated with the user account by an accounts services server based upon the identifier;
obtain rewards program data from a rewards program server via an electronic communication network based on the identifier;
apply one or more rewards benefits to a transaction based on the rewards program data;
obtain the cardholder data from the accounts services server via the electronic communication network based on the reference data, wherein the cardholder data includes a payment account number and the reference data does not include the payment account number; and
apply the cardholder data to the transaction by electronic communication via the electronic communication network with a payment services server of a payment services network to obtain payment associated with the transaction.

16. The non-transitory, machine-readable, storage medium of claim 15, wherein:
at least some of the reference data is temporary reference data that expires after a period of time; and
the instructions, when executed by the one or more processors, cause the POS system to obtain the cardholder data from the accounts services server based on the reference data for an additional retail transaction during the period of time.

17. The non-transitory, machine-readable, storage medium of claim 15, wherein the instructions, when executed by the one or more processors, cause the POS system to verify an application of the mobile device based on an application identifier of an application of the mobile device.

18. The non-transitory, machine-readable, storage medium of claim 15, wherein the reference data comprises a secure token generated by the accounts services server.

19. The non-transitory, machine-readable, storage medium of claim 15, wherein:
- the rewards program data includes one or more rules representing how the one or more rewards benefits are to be applied by the POS system; and
- the instructions, when executed by the one or more processors, cause the POS system to apply the one or more rewards benefits to the transaction based on the one or more rules.

* * * * *